June 9, 1936.                G. R. RICH                2,043,773
            COMPOSITE METAL VALVE FABRICATING APPARATUS
                    Filed Oct. 8, 1935          2 Sheets-Sheet 2
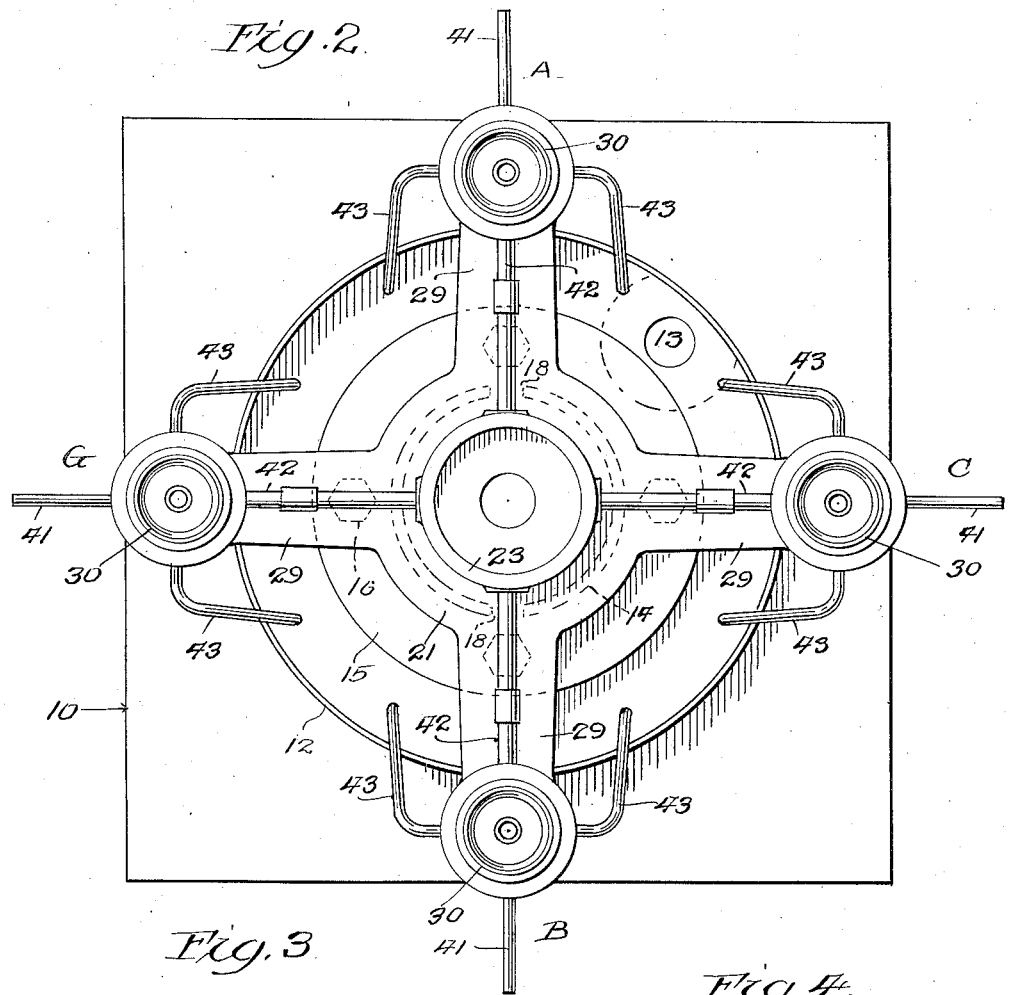

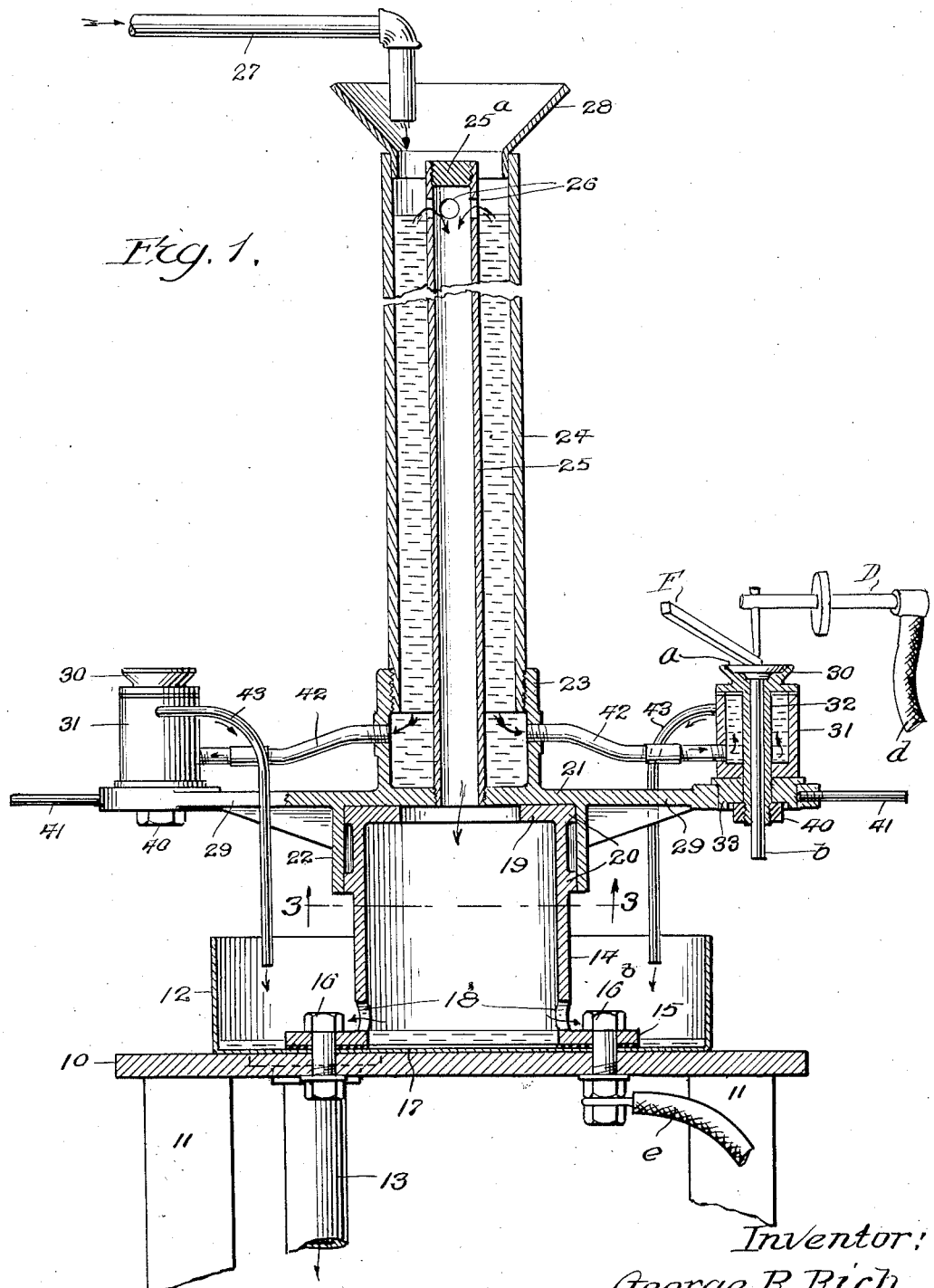

Patented June 9, 1936

2,043,773

UNITED STATES PATENT OFFICE 2,043,773

COMPOSITE METAL VALVE FABRICATING APPARATUS

George R. Rich, Battle Creek, Mich.

Application October 8, 1935, Serial No. 44,132

8 Claims. (Cl. 113—59)

This invention relates to composite metal valve fabricating apparatus, and has been devised to facilitate the manufacture of motor valves in which a cast metal insert is incorporated in the head thereof.

One of the objects of this invention is to provide simple apparatus by which composite metal valves may be readily and quickly assembled and fabricated. In the manufacture of composite metal valves the insert is usually formed by melting a portion from the end of a metal stick by the arc welding process and depositing the molten metal in and upon the other assembled parts of the valve, usually a metal rod and a metal cup and carrying on the fusing process for a sufficient length of time to enable the molten metal to fuse to or blend with the metal of the rod and cup and thereby form an integral body, which is incapable of separation by the usual service and high temperatures to which valves are subjected in internal combustion engines.

Another object is to provide novel means for cooling the forms in which the valves are fabricated, whereby the process of making the valves may be carried on rapidly and without any danger of overheating any of the parts.

Another object is to provide an apparatus in which the cooling means may be controlled so as to obtain the proper results in fusing the inserts to the cup and rod.

Other objects and advantages will appear in the course of this specification, and with all of said objects and advantages in view, this invention consists in the several novel features hereinafter fully set forth and claimed.

The invention is clearly illustrated in the accompanying drawings, in which:

Fig. 1 is a view, partly in side elevation and partly in vertical section, through a composite metal valve fabricating apparatus, illustrating one form of the invention;

Fig. 2 is a plan of the apparatus, with a certain standpipe and overflow pipe removed;

Fig. 3 is a detail, fragmental, horizontal section taken on the line 3—3 of Fig. 1; and Fig. 4 is a detail, vertical, fragmental section taken through one of the water jacketed forms used in the apparatus.

Referring to said drawings, the reference character 10 designates a table or platform supported by legs 11. Resting upon the table is a pan 12, from the bottom of which leads a water discharge pipe 13 that may run to any place for the discharge of the water.

Resting upon the bottom of the pan is a cylindrical drum 14, which is formed with an annular flange 15 at its lower end, that is bolted to the table by bolts and nuts, 16, 16ª. A gasket 17 is desirably interposed between the flange and bottom of the pan to provide a water tight joint. The drum is provided with outlet openings 18 adjacent its bottom for the discharge of water therefrom, as will be presently explained.

The drum is formed at its upper end with an inwardly directed flange 19 and with spaced, upper and lower annular external ribs 20, upon which flange and ribs a turntable 21 is rotatively mounted. The turntable rests upon the top flange of the drum and has a downturned annular flange 22 which surrounds and bears against the ribs of the drum. Obviously the turntable and parts mounted thereon may be readily rotated about the axis of the drum. Extending up from the upper side of the middle portion of the turntable is a cylindrical wall 23, internally threaded at its upper end, into which is screwed a standpipe 24 of suitable height. The turntable is formed with a central aperture into which is screwed an overflow pipe 25 disposed within the standpipe and extending substantially to the top thereof. The overflow pipe is closed at its upper end by a plug 25ª and below said closed end a number of overflow apertures 26 are formed in the overflow pipe that permit water to overflow from the surrounding space in the standpipe into the overflow pipe. Cooling water may be continuously supplied to the standpipe from a water supply pipe 27 connected to a suitable source of water supply and, if desired, a funnel 28 may be provided at the top of the standpipe to prevent water from splashing out of the standpipe. The overlow openings are located at a predetermined height in the overflow pipe so as to maintain a constant head of water in the standpipe. The overflow water passes down the overflow pipe into the interior of the drum and out through the outlet openings 18 therein into the pan, from which it discharges through the pipe 13.

As a preference, the turntable is provided with a plurality of radially disposed arms 29, four being shown, although this number may be increased or decreased, as desired. On the outer ends of the arms 29 are supported water jacketed forms 30, desirably composed of copper, which receive and hold the cups $a$ and rods $b$ of the valves during the casting and fusing operations. The forms and water jackets are more fully shown and described in a companion application filed October 8, 1935, Serial No. 44,131.

Briefly the forms 30 have countersinks in their upper faces of the same general contour as the cups, a, but of somewhat greater diameter so as to have clearance spaces between the side walls of the countersinks and the sides of the cups. The cups are formed with tapered rims on their upper sides and with necks on their lower sides. (See Fig. 4.) The forms rest upon the tops of the walls of water jackets 31, and have sleeves 32, that project down through the interiors of the water jackets, and down through flanged circular blocks 33 that are contained in holes at the outer ends of the turntable arms with the flanges resting on the tops of the arms. Nuts 40 threaded on the lower ends of the sleeves bear against the bottoms of the blocks 33 and fasten together the form, water jacket and block of each assembly. A rod 41, threaded in each turntable arm, bears against the associated block and secures the same in place in the arm. These rods 41 also serve as handles, whereby the workmen may rotate the turntable to bring the forms from one workman's station to another, as will be presently explained.

Connecting the water chamber (which is formed by the wall 23 at the bottom of the standpipe) with each water jacket, is a cold water pipe 42, which leads to the lower end of the water jacket and conducts cold water from the standpipe to the water jacket. Hot water discharge pipes 43 lead from the upper end of each water jacket down into the pan and conduct the hot water away from the water jackets. By regulating flow of water through the water jackets, the temperature of the cooling medium for the forms may be controlled, and by regulating the height of the column of water in the standpipe, any desired constant pressure is obtained.

In fabricating composite metal valves on the present apparatus at least two workmen are employed, one for placing the cups and rods in the forms, and preparing them for the casting operation, and another workman for performing the casting operation. The station for the first mentioned workman is indicated at A and for the second workman at B. (See Fig. 2.) The workman at station A inserts a rod with a cup thereon in the form at his station and pours a small quantity of borax (indicated by c in Fig. 4) on the cup and, with his fingers, presses some of it into the clearance space between the side wall of the countersink and rim of the cup, and presses some of it into the groove between the head of the rod and the neck of the cup. This not only provides a flux but it provides a seal between the rim of the cup and the adjacent side wall of the countersink. A cup and rod, prepared in this manner have previously been placed in the forms, indicated at C, B. While the first workman is preparing the parts, the workman at station B casts the insert into the cup.

The casting is done with an arc welding apparatus, of which the arc welding tool is seen at D in Fig. 1. The tool is illustrated merely in a conventional manner, but its construction is well known. One electrical conductor d, leads from the tool to the electric apparatus and an electrical conductor e, leads thereto from the bolt 16ª, which is grounded on the drum 14. The countersink in each form being of greater diameter than the cup, the only ground connection between the cup, a, and form 30 is through the contacting flat bottom of the cup and the flat bottom of the countersink. The rod, however, is grounded in the sleeve. By holding the point of the arc welding tool over the top of the rod and by moving it around over the flat bottom of the cup, the arc is confined to these places.

The insert is cast from a metal stick (see Fig. 1), desirably composed of electric furnace iron, containing suitable percentages of nickel and chromium. The cups are composed of stampings and desirably contain suitable percentages of nickel and chromium.

In casting the insert, the workman places one end of the metal stick on the head of the rod and applies the point of the arc welding tool thereto. With the arc that is formed, a temperature of approximately six thousand degrees is obtained and a quantity of metal is quickly melted away from the stick. With the point of the tool, the workman flows the molten metal around in the cup for a few seconds or until the contacting faces of the cup and head of the rod begin to fuse, thereby fusing or blending together the contacting surfaces of the molten metal and the cup and head.

The copper form rapidly absorbs the heat from the cup and rod, and the water absorbs the heat from the form and rapidly conducts it away therefrom. The exterior surface portion of the cup and of that part of the rod below the cup are therefore not brought up to a fusing temperature but remain unaffected.

After the casting operation, the turntable is rotated to bring the next form to the casting station and the workmen proceed as before. The valve in which the insert was last cast, having been moved to station G, is permitted to cool somewhat before being removed from the form.

With the use of the apparatus described, the work of casting the inserts is greatly simplified and may be done very quickly and effectively.

With the arc welding apparatus, a melting temperature is quickly obtained, but because of the cooling means, the external surfaces of the cup and rod are not overheated.

More or less variations of the exact details of construction is possible without departing from the spirit of this invention. I desire, therefore, not to limit myself to the exact form of the construction shown and described, but intend, in the following claims, to point out all of the invention disclosed herein.

I claim as new and desire to secure by Letters Patent:

1. Composite metal valve fabricating apparatus, comprising in combination a turntable, a support therefor, water jacketed valve holding forms mounted on said turntable, said forms having countersinks in which are supported valve parts, each form comprising an electrical ground connection for an arc welding tool by which an insert is deposited upon and fused to the valve parts, and means for circulating cooling water through the water jackets of said forms.

2. Composite metal valve fabricating apparatus, comprising in combination a turntable, a support therefor, water jacketed valve holding forms mounted on said turntable, said forms having countersinks in which are supported valve parts, each form comprising an electrical ground connection for an arc welding tool by which an insert is deposited upon and fused to the valve parts, a standpipe, water pipes connecting said standpipe with the water jackets of the forms, and water discharge pipes leading away from said water jackets.

3. Composite metal valve fabricating apparatus, comprising in combination a turntable, a support therefor, water jacketed valve holding forms mounted on said turntable, said forms having countersinks in which are supported valve parts, each form comprising an electrical ground connection for an arc welding tool by which an insert is deposited upon and fused to the valve parts, a standpipe mounted on and rotating with said turntable, a water supply pipe discharging into said standpipe, an overflow pipe leading from the upper end of the standpipe, water connections between the standpipe and the jackets of the forms, and water discharge connections leading away from the water jackets.

4. Composite metal valve fabricating apparatus, comprising in combination a turntable, a support therefor, water jacketed valve holding forms mounted on said turntable, said forms having countersinks to receive valve heads, and sleeves extending through the water jackets for receiving valve stems, and means to circulate water through the water jackets.

5. Composite metal valve fabricating apparatus, comprising in combination a hollow drum-like support, a turntable resting on said drum and having a downturned flange rotatively guided on said drum, water jacketed valve holding forms mounted on said turntable, and water circulating means connected with each water jacket and having an overflow pipe discharging into said drum.

6. Composite metal valve fabricating apparatus, comprising in combination a hollow drum-like support, a turntable rotatively mounted thereon, said turntable having a plurality of radially disposed arms, water jacketed valve holding forms mounted on said arms, and water circulating means for the water jackets of said forms, mounted on said turntable, and having an overflow pipe discharging into said drum.

7. A composite metal valve fabricating apparatus, comprising in combination a support, a turntable rotatively mounted thereon, and water jacketed valve holding forms mounted on said turntable, said forms having valve head receiving countersinks and stem receiving sleeves.

8. Composite metal valve fabricating apparatus, comprising in combination a table, a pan thereon, a hollow cylindrical turntable support rising from said pan, said support having water discharge outlets opening to said pan, a turntable rotatively mounted on said support, water jacketed valve holding forms mounted on the turntable, a standpipe mounted on the turntable, pipe connections leading from said standpipe to the water jackets of the forms, water discharge pipes leading from the water jackets to the pan, and an overflow pipe leading from the upper end of the standpipe to the hollow of the turntable support.

GEORGE R. RICH.